United States Patent Office 3,406,070
Patented Oct. 15, 1968

3,406,070
PROCESS FOR THE MANUFACTURE OF OP-
TICALLY BRIGHTENED PHOTOGRAPHIC
MATERIAL
Alfred Oetiker, Basel, and Paul Schaefer, Riehen, Switzerland, assignors to Ciba Limited, Basel, Switzerland, a Swiss company
No Drawing. Filed Feb. 19, 1965, Ser. No. 434,119
Claims priority, application Switzerland, Mar. 4, 1964,
2,715/64
12 Claims. (Cl. 96—82)

ABSTRACT OF THE DISCLOSURE

Valuable optically brightened photographic silver halide materials are obtained when an emulsion is dispersed in a photographic colloid which emulsion contains, emulsified in water, a solution in an organic solvent comprising (a) a hydrophilic polymerization resin having a refractive index similar to that of the photographic colloid, and (b) an optical brightening agent free from acid groups imparting solubility in water, and the dispersion so prepared is applied to a support and the layer obtained is dried.

---

This invention is based on the observation that valuable optically brightened photographic material is obtainable when an emulsion is dispersed in a photographic colloid which emulsion contains, emulsified in water, a solution in an organic solvent comprising (a) a hydrophilic polymerization resin having a refractive index similar to that of the photographic colloid, and (b) an optical brightening agent free from acid groups imparting solubility in water, and the dispersion so prepared is applied to a support and the layer obtained is dried.

In this process a support is provided with one or more layers of a photographic colloid, preferably gelatine, the said layers advantageously being applied in known manner. At least one of the layers, preferably not the top layer, has the composition indicated above. In the case of multilayer color photographic material for the color development or silver dyestuff bleaching process, the optical brightener is advantageously incorporated in the layer containing the cyan coupler or the cyan dyestuff, provided the said layer forms the lowest color layer, as is usually the case.

As is indicated above, a solution of two substances, namely a polymerization resin and optical brightener in an organic solvent, is required for the process of the invention. The solvent used has to be capable of dissolving adequate amounts of both polymerization resin and optical brightener and must be immiscible with water and preferably only slightly soluble in water. Furthermore, the solvent must have a high vapor pressure and/or a low boiling point since it has to be removed from the photographic layers by drying. It is also advantageous if the solvent is capable of forming an azeotropic mixture with water. Example are hydrocarbons of the benzene series, for example, benzene, toluene and xylenes, and especially aliphatic chlorinated hydrocarbons, for example, methylene chloride and especially 1:2-dichloroethane.

The polymerization resins must have a refractive index similar to that of the photographic colloid. In the case of gelatine the refractive index of the dry, solvent-free resin ($n_D^{20°}$) is between 1.49 and 1.55; preferably between 1.52 and 1.53. Furthermore, the polymerization resin must be hydrophilic. This property is advantageously obtained by the incorporation of copolymerizable hydroxyl, amide or imide compounds, for example, vinylpyrrolidone, or preferably carboxylic acids. It is also possible to use mixtures of such copolymerizable compounds imparting solubility in water. Furthermore, the polymerization resin must be sufficiently flexible and not too hard because the support for the photographic layers must remain flexible. Vinylidene chloride and especially styrene yield polymers having refractive indices that are suitable for gelatine. However, since these monomers yield hard polymers it is advantageous to add a softening component, for example, acrylic acid-n-butyl ester or methacrylic acid-n-butyl ester. Substances suitable for imparting the requisite hydrophilic properties to the polymer are methacrylic acid and acrylic acid. Accordingly, polymerization resins that are obtained by the copolymerization of (a) 40 to 45% of styrene or vinylidene chloride,
(b) 43 to 48% of an acrylic or methacrylic acid alkyl ester whose alkyl radical contains 4 to 20 carbon atoms, for example, acrylic or methacrylic acid butyl ester, and
(c) 7 to 15% of acrylic acid or methacrylic acid, can adavntageously be used for photographic material containing gelatine.

The optical brightening agents to be used in the process of the present invention must be free from acidic groups imparting solubility in water, for example, carboxylic acid and sulfonic acid groups. Very many different optical brightening agents can be used, especially those that contain at least one heterocyclic five-membered or six-membered ring, for example, an oxazole, a thiazole, an imidazole, a triazole, a pyrazole, a furan, a thiophene, a peri-dicarboxylic acid amide or a coumarin ring. Examples of optical brighteners suitable for use in the process of the present invention are given in the following paragraphs 1–7:

(1) Benzoxazole compounds

(11) Benzoxazole compounds of the formula (1)

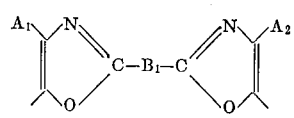

in which $A_1$ and $A_2$ each represents a benzene nucleus bound to an oxazole ring in the manner indicated by the valency lines and which may be substituted, for example, by chlorine atoms or methyl groups, but especially by alkyl groups containing at least 4 carbon atoms, and $B_1$ represents a bridging group that forms a continuous chain of conjugated double bonds with the oxazole rings, for example, a radical of the formula (2)

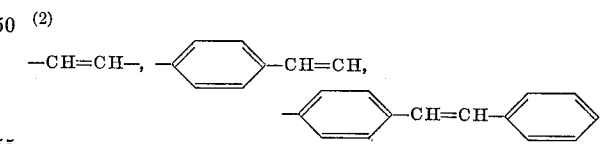

or especially

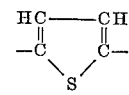

(12) Benzoxazole compounds of the formula (3)

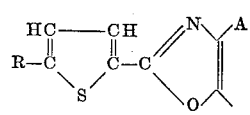

in which A represents a benzene nucleus bound to the oxazole ring in the manner indicated by the valency lines and which may be further substituted, and R represents a benzene radical that likewise may be further substituted.

(2) Benzimidazole compounds

(21) Benzimidazole compounds of the formula (4)
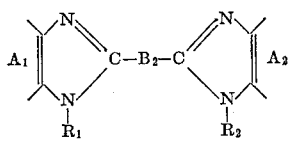

in which $A_1$ and $A_2$ each represents a benzene nucleus bound to an imidazole ring in the manner indicated by the valency lines and which may be substituted, $B_2$ represents a bridging group that forms a continuous chain of conjugated double bonds with the imidazole rings, for example, a radical of the formula (5)
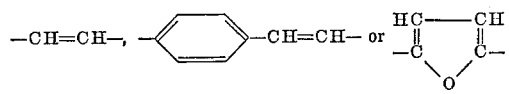

and $R_1$ and $R_2$ each represents a hydrogen atom or a substituent, for example, an alkyl, hydroxyalkyl or an aralkyl group.

(22) Benzimidazole compounds of the formula (6)
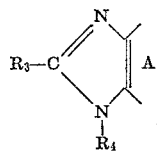

in which A represents a benzene ring bound to the imidazole ring in the manner indicated by the valency lines and which may carry further substituents, $R_3$ represents a stilbene radical bound to the imidazole ring in 4-position and which may be further substituted or a 5-phenylthiophene radical bound to the imidazole ring in 2-position and which may be further substituted, and $R_4$ represents a hydrogen atom or a substituent, for example, an alkyl, hydroxyalkyl or an aralkyl group.

(3) Pyrazoline compounds of the formula (7)
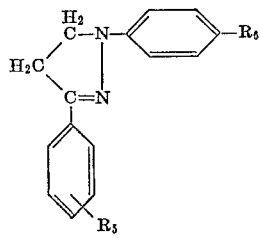

in which $R_5$ represents a hydrogen atom, a halogen atom, for example, chlorine, or an alkyl group, for example, a methyl group, and $R_6$ represents a carboxylic acid alkyl ester group, for example, a carboxylic acid methyl ester group, or a sulfonic acid amide group.

(4) Coumarin compounds

(41) 7-triazinylaminocoumarins of the formula (8)
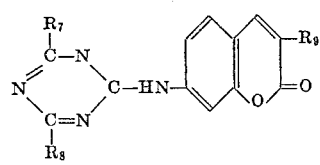

in which $R_7$ and $R_8$ represent identical or different substituents, for example, chlorine atoms, $H_2N—$ groups, radicals of primary or secondary amines or alkoxy groups, especially methoxy groups, and $R_9$ represents a benzene radical which may be further substituted.

(42) 2-triazinylaminocoumarins of the formula (9)
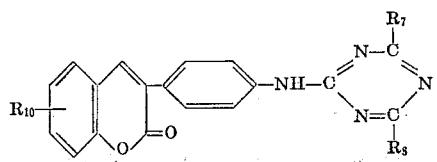

in which $R_7$ and $R_8$ have the meanings given above under 41, and $R_{10}$ represents a hydrogen atom or a substituent.

(43) 7-pyrazolylcoumarins of the formula

(10)
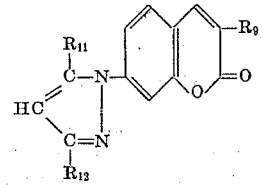

in which $R_9$ has the meaning given above under 41, and $R_{11}$ and $R_{12}$ may be identical or different and represent hydrogen atoms, alkyl radicals, for example, methyl radicals, or aryl radicals, for example, phenyl radicals.

(5) Naphthalic acid imides of the formula

(11)
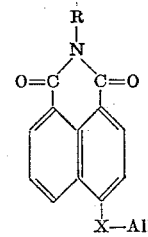

in which R represents an alkyl, aryl or aralkyl group, for example, a methyl, phenyl or benzyl group, and X represents a sulfur or oxygen atom.

(6) Stilbenetriazole compounds of the formula (12)

in which $R_{13}$ represents a hydrogen atom, a halogen atom, for example, chlorine or an alkyl group, for example, a methyl group, and $R_{14}$ represents a cyano group, a carboxylic acid alkyl ester group, for example, a carboxylic acid methyl ester group, or a carboxylic acid amide or sulfonic acid amide group which may be further substituted at the nitrogen atom.

(7) Distyrylbenzenes of the formula

(13)
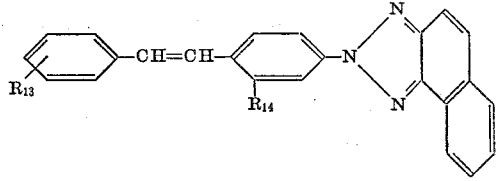

in which $R_{15}$ and $R_{16}$ may be identical or different and represents alkyl groups, for example, methyl groups, alkoxy groups, for example, methoxy groups, cyano groups or carboxylic acid alkoxy ester groups.

To prepare the solution of polymerization resin and optical brightener in the organic solvent, as required in the present process, the polymerization can advantageously be carried out in the solvent itself e.g. in the usual manner in the presence of free-radical forming catalysts, for example, azo compounds and/or peroxides. The optical brightener can be added when polymerization is finished, if necessary, after the addition of further organic solvent. The quantitive ratio of optical brightener to polymerization resin (without solvent) can vary within fairly wide limits.

The solution thus obtained must then be emulsified in water, in which process a dispersing agent is generally required. Suitable substances are, for example, anionic products, for example, sulfonates or salts of acid, sulfuric acid esters containing higher alkyl radicals. It is generally advantageous to raise the pH of the emulsion, for example, by the addition of ammonia, to a value closely approaching that of the photographic colloid, for example, the gelatine-silver halide emulsion, in which the emulsion containing the brightener is to be incorporated. An emulsion of the kind defined can be readily homogeneously mixed with the photographic layer material containing the colloid, preferably gelatine, and, as a rule, with other substances, especially silver halide and, in the case of color photographic material, color couplers or bleachable dyestuffs, whereupon coating may be effected in the customary manner. The emulsion containing the optical brightener may also be incorporated in the baryta layer or in an auxiliary layer free from silver halide disposed above the baryta layer. The amount of emulsion containing brightener to be used depends on the amount of brightener present in the emulsion and on the degree of brightening required; it can vary within wide limits and may be such, for example, that 25 to 30 mg. of optical brightener are present per square metre of surface.

The support to which the layer containing the optical brightener is applied, and generally the other layers, must be opaque; for example, it may be cellulose acetate pigmented with white pigments or preferably baryta paper. The layer may be applied in the usual thickness and by the usual methods, and the material thus prepared may be dried and further treated in the usual manner.

The process of the present invention is specially valuable because the photographic material it yields displays a brightening effect that is not only strong, if so desired especially, at the white and very light areas of the image, but in that it is also resistant to light.

The following examples illustrate the invention. Unless otherwise stated, the parts and percentages are by weight.

Example 1

235 parts of styrene, 237.5 parts of acrylic acid n-butyl ester and 37.5 parts of acrylic acid are dissolved in 280 parts of 1:2-dichloroethane. A third of this solution is heated to 75° C. while stirring and with introduction of nitrogen. Polymerization is started by addition of a solution of 3.75 parts of azodiisobutyronitrile in 25 parts of 1:2-dichloroethane. A solution of 3.75 parts of azodiisobutyronitrile in 25 parts of dichloroethane is then added to the remaining monomer solution and the whole added to the polymerization vessel in the course of 2 hours. After another 100 minutes 2.5 parts of benzoylperoxide are added and polymerization continued for about 15 hours. After cooling the batch to 60° C. it is diluted to a dry resin content of 55% with 100 parts of 1:2-dichloroethane, whereupon 12.5 parts of the optical brightening agent of the formula (14)

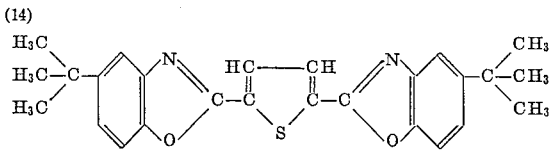

are added and the batch stirred until the brightener is dissolved.

The solution is cooled to room temperature, mixed with a solution of 51 parts of sodium lauryl sulfonate in 185 parts of water, worked up into a uniform emulsion by the gradual addition of 460 parts of water, the pH being adjusted to between 7.5 and 8.5 by the addition of concentrated aqueous ammonia. The batch is then filtered and a fine dispersion having a dry resin content of 32% is obtained.

The cyan dyestuff of the formula (15)

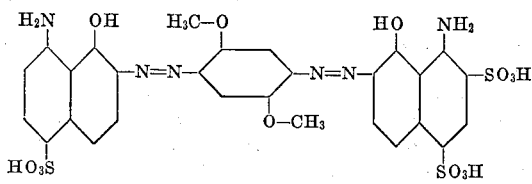

a red sensitizer and the usual coating additives, for example, stabilizers, wetting agents and hardening agents are added in known manner at 40° C. to 1 kg. of a highly sensitive silver iodobromide emulsion having a gelatine content of 8%. 30 cc. of the dispersion described above containing the optical brightener and the polymer are diluted with 150 cc. of water and then stirred into the photographic emulsion. The batch is then filtered and adjusted to the required viscosity by the addition of water. A layer 6μ thick (when dry) is then produced at a coating temperature of 40° C. and a coating rate of 6 m./min. on a baryta paper support weighing 190 grams per square meter. Other layers normally required in material for the silver dyestuff bleaching process can be coat on the material so prepared, especially a magenta layer sensitized to green light and a yellow layer. Images produced with material containing the optical brightening agent show a distinct brightening effect at their white areas as opposed to images produced with material prepared in the same manner but without the addition of the emulsion containing the optical brightening agent.

Example 2

The following monomers are copolymerized:

| | (a) | Parts |
|---|---|---|
| Styrene | | 225 |
| Methacrylic acid-n-butyl ester | | 237.5 |
| Acrylic acid | | 37.5 |
| | (b) | |
| Styrene | | 225 |
| Methacrylic acid-n-butyl ester | | 237.5 |
| Methacrylic accid | | 37.5 |
| | (c) | |
| Styrene | | 217.5 |
| Methacrylic acid-n-butyl ester | | 232.5 |
| Methacrylic acid | | 50 |
| | (d) | |
| Styrene | | 210 |
| Methacrylic acid-n-butyl ester | | 215 |
| Methacrylic acid | | 75 |
| | (e) | |
| Vinylidene chloride | | 200 |
| Acrylic acid-n-butyl ester | | 262.5 |
| Acrylic acid | | 37.5 |

Polymerization is carried out by the method described in Example 1, with the following exceptions: in the case of (d) 25 parts of isopropanol are added to the polymerization batch. In the case of (e) 5 parts of n-dodecylmercaptan is added and polymerization is started at 60° C.

The copolymer obtained with (a), (b), (c), (d) or (e) is worked up into an emulsion with the optical brightener in the manner described in Example 1, the emulsion thus prepared as is dispersed in the gelatine and a photographic layer prepared.

Example 3

88 parts of styrene, 92 parts of methacrylic acid-n-butyl ester and 20 parts of methacrylic acid are dissolved in 105 parts of 1:2-dichloroethane and 5 parts of isopropanol. A quarter of this solution is heated to 85° C. and polymerization is started by addition of a solution of 0.75 part of azodiisobutyronitrile in 5 parts of 1:2-dichloroethane. A solution of 2.25 parts of azodiisobutyronitrile in 15 parts of 1:2-dichloroethane is then added to the remaining monomer solution and the whole added to the polymerization vessel in the course of 6 hours. After another hour 1 part of azodiisobutyronitrile is added, polymerization is continued for about 18 hours and the batch then cooled to room temperature.

(A) 70 parts of this solution are diluted with 10 parts of 1:2-dichloroethane, 1.13 parts of the optical brightening agent of the formula

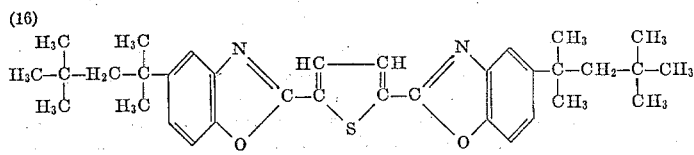

(16)

are added, and the whole heated at 60° C. until the optical brightener has dissolved.

The solution is cooled at room temperature, mixed with a solution of 4.4 parts of sodium lauryl sulfonate in 16 parts of water and the whole worked up into a homogeneous emulsion by the gradual addition of 87 parts of water, the pH being adjusted to a value between 7.5 and 8.5 by the addition of concentrated aqueous ammonia. A fine dispersion having a dry resin content of 25% is obtained.

(B) 32 parts of the polymer solution described above are diluted with 4.6 parts of 1:2-dichloroethane; 2 parts of the fluorescent brightening agent of the formula

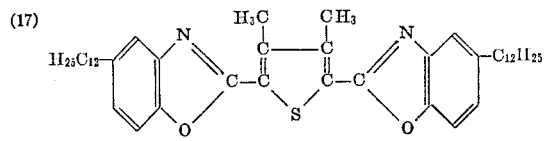

(17)

are added and the whole heated at 60° C. until the optical brightening agent had dissolved.

A fine dispersion having a dry resin content of 29% is obtained by the process described above under (A) by the addition of 2 parts of sodium lauryl sulfonate dissolved in 7 parts of water, and 40 parts of water.

(C) 64 parts of the polymer solution described above are diluted with 9.2 parts of 1:2-dichloroethane; 1 part of the optical brightening agent of the Formula 16, 0.5 part of the optical brightening agent of the the formula

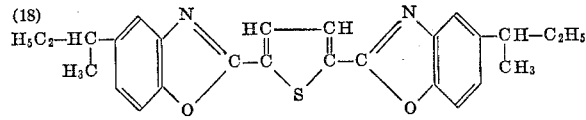

(18)

and 0.5 part of the fluorescent brightening agent of the Formula 14 are added and the whole heated at 60° C. until the mixture of optical brightening agents has dissolved.

A fine dispersion having a dry resin content of 25% is obtained by the process described above under (A) by the addition of 4 parts of sodium lauryl sulfonate dissolved in 14 parts of water, and 85 parts of water.

The dispersions obtained by the processes described under A, B or C above are incorporated in a gelatine-silver halide emulsion in the manner described in Example 1 and photographic layers are prepared.

Example 4

83 parts of styrene, 87 parts of a mixture comprising methacrylic acid octyl-ester and methacrylic acid decyl-ester, and 30 parts of acrylic acid are dissolved in 108 parts of 1:2-dichloroethane and 4 parts of isopropanol. Half of this solution is heated to 75° C. and polymerization started by the addition of a solution of 1.5 parts of azodiisobutyronitrile in 10 parts of 1:2-dichloroethane. A solution of 1.5 parts of azodiisobutyronitrile in 10 parts of 1:2-dichloroethane is added to the remaining monomer solution and the whole added to the polymerization vessel in the course of 50 minutes. After another 2 hours, 1 part of benzoyl peroxide is added and polymerization continued for about 20 hours.

After cooling the batch to 60° C. it is diluted with 34 parts of 1:2-dichloroethane; 5 parts of the optical brightening agent of the Formula 14 are added and the batch stirred until the said brightening agent has dissolved.

The solution is cooled to room temperature, mixed with a solution of 20 parts of sodium lauryl sulfonate in 80 parts of water and the whole worked up into a homogeneous emulsion by the gradual addition of 355 parts of water, the pH being adjusted to a value between 7.5 and 8.5 by the addition of concentrated aqueous ammonia. A fine dispersion having a dry resin content of 25% is obtained.

A silver halide-gelatine emulsion containing the optical brightening agent is prepared with the dispersion so obtained by the method described in Example 1 and photographic layers are also prepared in the manner described in Example 1.

Example 5

The usual coating additives, for example, stabilizers, wetting agents and hardening agents, and 500 cc. of a 2% aqueous solution of a color coupler of the formula

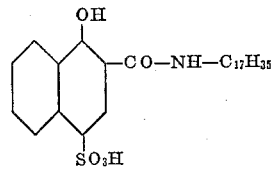

(19)

suitable for color development were added in the usual manner at 40° C. to 1 kg. of a red-sensitized silver chlorobromide emulsion containing 30 grams of silver halide and 80 grams of gelatine, 30 cc. of the dispersion described in Example 1 containing the optical brightener and the polymer are diluted at room temperature with 150 cc. of water and likewise added to the photographic emulsion. The batch is then filtered and adjusted to the required viscosity by the addition of water. A layer 6μ thick (when dry) is produced at a coating temperature of 40° C. and at a coating rate of 6 m./min. on a baryta paper support weighing 190 grams per square meter.

The material thus prepared is processed in baths suitable for the color-development process. Images produced with the material containing the optical brightening agent show a distinct brightening effect at their white areas as opposed to images produced with material prepared in a similar manner but without the addition of the emulsion containing the optical brightening agent.

What is claimed is:

1. A process for the manufacture of optically brightened photographic silver halide material, which comprises dispersing in a photographic colloid an emulsion containing, emulsified in water, a solution in an organic solvent comprising (a) a hydrophilic polymerization resin having a refractive index similar to that of the photographic colloid, and (b) an optical brightening agent free from acid groups imparting solubility in water, and applying the so-prepared dispersion to a support and drying the material.

2. A process for the manufacture of optically brightened photographic silver halide material, which comprises dispersing in gelatine an emulsion, containing, emulsified in water, a solution in an organic solvent comprising (a) a hydrophilic polymerization resin having a refractive index $n_D^{20°}$ between 1.49 and 1.55, and (b) an optical brightening agent free from acid groups imparting solubility in water, and applying the so-prepared dispersion to a support and drying the material.

3. A process for the manufacture of optically brightened photographic silver halide material, which comprises dispersing in gelatine an emulsion, containing, emulsified in water, a solution in an organic solvent comprising (a) a hydrophilic polymerization resin owing its hydrophilic properties to the presence of carboxylic acid groups and having a refractive index $n_D^{20°}$ between 1.52 and 1.53, and (b) an optical brightening agent free from groups imparting solubility in water, and applying the so-prepared dispersion to a support and drying the material.

4. A process for the manufacture of optically brightened photographic silver halide material, which comprises dispersing in gelatine an emulsion, containing, emulsified in water, a solution in organic solvent comprising
   (a) a hydrophilic polymerization resin which has a refractive index $n_D^{20°}$ between 1.52 and 1.53 and which has been obtained by copolymerization of
      (α) 40 to 45% of a member selected from the group consisting of styrene and vinylidene chloride
      (β) 43 to 48% of a member selected from the group consisting of an acrylic and a methacrylic acid alkyl ester whose alkyl radical contains 4 to 20 carbon atoms, and
      (γ) 7 to 15% of a member selected from the group consisting of acrylic and methacrylic acid, and
   (b) an optical brightening agent free from groups imparting solubility in water, and applying the so-prepared dispersion to a support and drying material.

5. A process for the manufacture of optically brightened photographic silver halide material, which comprises dispersing in gelatine an emulsion, containing, emulsified in water, a solution in an organic solvent comprising
   (a) a hydrophilic polymerization resin which has a refractive index $n_D^{20°}$ between 1.52 and 1.53 and which has been obtained by copolymerization of
      (α) 40 to 45% of a member selected from the group consisting of styrene and vinylidene chloride
      (β) 43 to 48% of a member selected from the group consisting of an acrylic and a methacrylic acid alkyl ester whose alkyl radical contains 4 to 20 carbon atoms, and
      (γ) 7 to 15% of a member selected from the group consisting of acrylic and methacrylic acid, and
   (b) an optical brightening agent of the formula

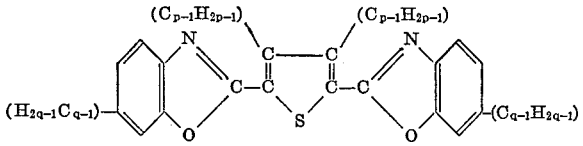

wherein $p$ represents an integer of at the most 2 and $q$ represents an integer of at the most 13, and applying the so-prepared dispersion to a support and drying the material.

6. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of acrylic acid n-butyl ester and 7 to 15% of acrylic acid, and (b) the optical brightening agent of the formula

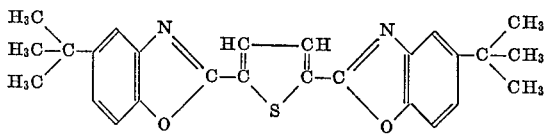

and applying the so-prepared dispersion to a support and drying the material.

7. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of methacrylic acid-n-butyl ester and 7 to 15% of acrylic acid and (b) the optical brightening agent of the formula

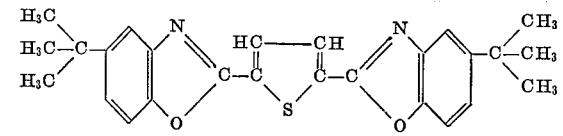

and applying the so-prepared dispersion to a support and drying the material.

8. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of methacrylic acid-n-butyl ester and 7 to 15% of methacrylic acid, and (b) the optical brightening agent of the formula

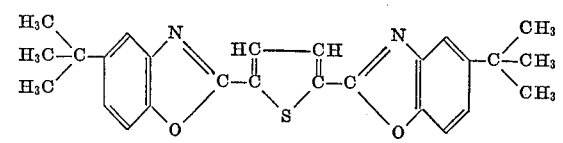

and applying the so-prepared dispersion to a support and drying the material.

9. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of vinylidene chloride, 43 to 48% of acrylic acid-n-butyl ester and 7 to 15% of acrylic acid and (b) the optical brightening agent of the formula

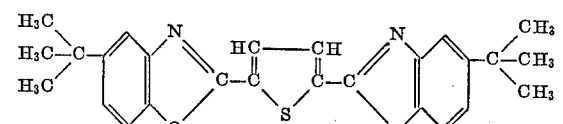

and applying the so-prepared dispersion to a support and drying the material.

10. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of methacrylic acid-n-butyl ester and 7 to 15% of methacrylic acid, and (b) the optical brightening agent of the formula

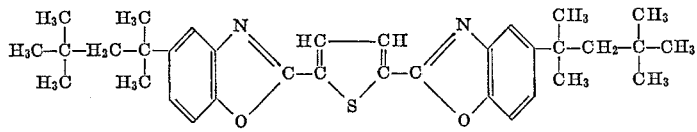

and applying the so-prepared dispersion to a support and drying the material.

11. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of methacrylic acid-n-butyl ester and 7 to 15% of methacrylic acid, and (b) the optical brightening agent of the formula

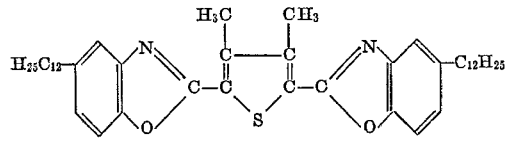

and applying the so-prepared dispersion to a support and drying the material.

12. A process for the manufacture of optically brightened photographic silver halide material, which comprises dispersing in gelatine an emulsion containing, emulsified in water, a solution in 1:2-dichloroethane comprising (a) a hydrophilic polymerization resin which has a refractive index $n_D^{20°}$ between 1.52 and 1.53 and which has been obtained by copolymerization of 40 to 45% of styrene, 43 to 48% of methacrylic acid-n-butyl ester and 7 to 15% of methacrylic acid, and (b) the optical brightening agent of the formula

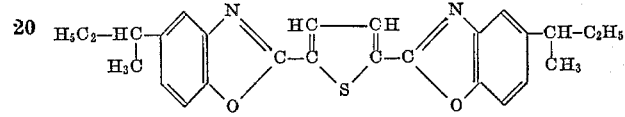

and applying the so-prepared dispersion to a support and drying the material.

References Cited
FOREIGN PATENTS
1,150,274  6/1963  Germany.
646,150  7/1964  Belgium.
641,414  4/1964  Belgium.

NORMAN G. TORCHIN, *Primary Examiner.*

RONALD H. SMITH, *Assistant Examiner.*